(12) United States Patent
Joseph Durairaj et al.

(10) Patent No.: US 10,789,367 B2
(45) Date of Patent: Sep. 29, 2020

(54) PRE-COGNITIVE SECURITY INFORMATION AND EVENT MANAGEMENT

(71) Applicant: HEWLETT PACKARD ENTERPRISE DEVELOPMENT LP, Houston, TX (US)

(72) Inventors: Satheesh Kumar Joseph Durairaj, Sunnyvale, CA (US); Anurag Singla, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 688 days.

(21) Appl. No.: 15/303,771

(22) PCT Filed: Apr. 18, 2014

(86) PCT No.: PCT/US2014/034709
§ 371 (c)(1),
(2) Date: Oct. 13, 2016

(87) PCT Pub. No.: WO2015/160367
PCT Pub. Date: Oct. 22, 2015

(65) Prior Publication Data
US 2017/0032130 A1 Feb. 2, 2017

(51) Int. Cl.
*G06F 21/57* (2013.01)
*G06F 21/55* (2013.01)
(Continued)

(52) U.S. Cl.
CPC .......... *G06F 21/577* (2013.01); *G06F 21/552* (2013.01); *G06N 3/0436* (2013.01);
(Continued)

(58) Field of Classification Search
None
See application file for complete search history.

(56) References Cited

U.S. PATENT DOCUMENTS

| | | | |
|---|---|---|---|
| 7,013,395 B1 | 3/2006 | Swiler et al. | |
| 7,530,105 B2 * | 5/2009 | Gilbert | G06F 21/55 709/222 |

(Continued)

FOREIGN PATENT DOCUMENTS

| | | |
|---|---|---|
| CN | 101980480 A | 2/2011 |
| CN | 102231743 A | 11/2011 |
| WO | WO-2013/113532 A1 | 8/2013 |

OTHER PUBLICATIONS

Gang Wang et al., "A New Approach to Intrusion Detection Using Artificial Neural Networks and Fuzzy Clustering," Expert Systems with Applications, 2010, pp. 6225-6232.

(Continued)

*Primary Examiner* — Farid Homayounmehr
*Assistant Examiner* — Olanrewaju J. Bucknor

(57) ABSTRACT

According to an example, pre-cognitive SIEM may include using trained classifiers to detect an anomaly in input events, and generating a predictive attack graph based on the detected anomaly in the input events. The predictive attack graph may provide an indication of different paths that can be taken from an asset that is related to the detected anomaly to compromise other selected assets in a network of the asset, and the other selected assets may be selected based on a ranking criterion and a complexity criterion. A rank list and a complexity list may be generated. The rank list, the complexity list, a depth of the predictive attack graph, and a weighted value may be used to generate a score that provides an indication of a number of assets that can be compromised and a difficulty of exploiting vulnerabilities related to services of the assets that can be compromised.

15 Claims, 10 Drawing Sheets

(51) Int. Cl.
*H04L 29/06* (2006.01)
*H04L 12/26* (2006.01)
*G06N 3/04* (2006.01)
*G06N 3/08* (2006.01)

(52) U.S. Cl.
CPC ............... *G06N 3/08* (2013.01); *H04L 43/00* (2013.01); *H04L 63/1416* (2013.01); *H04L 63/1433* (2013.01); *G06F 2221/034* (2013.01)

(56) References Cited

U.S. PATENT DOCUMENTS

| | | | |
|---|---|---|---|
| 8,392,997 | B2 | 3/2013 | Chen et al. |
| 8,464,346 | B2 | 6/2013 | Barai et al. |
| 8,725,667 | B2 * | 5/2014 | Kaushal ............ G05B 13/0265 706/14 |
| 8,813,234 | B1 * | 8/2014 | Bowers ................ G06F 21/552 726/25 |
| 9,148,441 | B1 * | 9/2015 | Tamersoy ........... H04L 63/1416 |
| 9,166,997 | B1 * | 10/2015 | Guo ..................... H04L 63/1433 |
| 9,256,739 | B1 * | 2/2016 | Roundy ................ G06F 21/554 |
| 9,703,845 | B2 * | 7/2017 | Iesiev ................. H04L 63/1408 |
| 10,210,470 | B2 * | 2/2019 | Datta Ray ........... H04L 63/1433 |
| 2007/0226796 | A1 * | 9/2007 | Gilbert ................ H04L 63/1425 726/22 |
| 2010/0058456 | A1 | 3/2010 | Jajodia et al. |
| 2010/0192195 | A1 | 7/2010 | Dunagan et al. |
| 2011/0185422 | A1 | 7/2011 | Khayam et al. |
| 2012/0240185 | A1 * | 9/2012 | Kapoor ............... H04L 63/1425 726/1 |
| 2013/0219503 | A1 | 8/2013 | Amnon et al. |
| 2014/0096249 | A1 * | 4/2014 | Dupont .................. G06F 21/00 726/23 |
| 2015/0058993 | A1 * | 2/2015 | Choi ...................... G06N 7/005 726/25 |
| 2017/0289187 | A1 * | 10/2017 | Noel .................. H04L 63/1433 |
| 2017/0302691 | A1 * | 10/2017 | Singh ................. H04L 63/1425 |

OTHER PUBLICATIONS

Igor Nai Fovino and Marcelo Masera, "Through the Description of Attacks: A Multidimensional View," International Conference on Computer Safety, Reliability, and Security, 2006, pp. 1-14, Springer Berlin Heidelberg.

International Search Report and Written Opinion, International Application No. PCT/US2014/034709, dated Jan. 13, 2015, pp. 1-8, KIPO.

Lixia Xie et al., "Network Security Risk Assessment Based on Attack Graph," Journal of Computers 8.9, 2013, pp. 2339-2347, vol. 8, No. 9, Academy Publisher.

M. Jawhar and M. Mehrotra, "Design Network Intrusion Detection System using Hybrid Fuzzy-Neural Network," International Journal of Computer Science and Security, 2010-07-26, pp. 285-294. vol. 4, Issue 3.

Nirnay Ghosh and S.K. Ghosh, "A Planner-Based Approach to Generate and Analyze Minimal Attack Graph," (Research Paper), Applied Intelligence 36, Mar. 2012, pp. 369-390, Springer Science+ Business Media, LLC.

Nirnay Ghosh and S.K. Ghosh, "An intelligent Technique for Generating Minimal Attack Graph," First Workshop on Intelligent Security (Security and Artificial Intelligence) (SecArt'09), Aug. 6, 2009, pp. 1-10.

Chu, Matthew; "Visualizing Attack Graphs, Reachability, and Trust Relationships with Navigator"; MIT Lincoln Laboratory; Sep. 14, 2010; 18 pp.

Ingols, Kyle; "Practical Attack Graph Generation for Network Defense"; 22nd Annual Computer Security Applications Conference, 2006;10 pp.

* cited by examiner

| compromise | hostile | recon | info |
|---|---|---|---|
| /Compromise | /Hostile | /Recon | /Informational/Warning |
| | Hostile | Recon | /Informational |
| | | /Suspicious | /Informational/Alert |
| | | | /Informational/Error |
| | | | Informational/Warning |
| | | | Informational |
| | | | /Normal |

FIG. 2

| Asset ID | Sub-sys-ID | Service | Vulnerabilities | Rank |
|---|---|---|---|---|
| A1 | HP1 | {IIS web service} | {142352} | 7 |
| A2 | HP1 | {FTP, SSH, RSH} | {9563,7347,1521} | 5 |
| A3 | HP1 | {Netbios-ssn, RSH} | {28432,1521} | 5 |
| A4 | HP1 | {LICQ, Squid Proxy, MySQL} | {468523,7343,2242} | 10 |

FIG. 4

| v-ID | Name | Effects/Elevated Privilege |
|---|---|---|
| 142352 | IIS Buffer Overflow | Remotely gains root privileges |
| 9563 | ftp rhost overwrite | Creates a .rhost file in ftp home directory establishing remote login trust relationship |
| 7347 | ssh buffer overfow | Gives a root shell on the victim machine |
| 1521 | rsh login | Existing remote login trust relationship is used to log into target machine without providing password |
| 28432 | Netbios-ssn nullsession | Establishing null session with blank username, password or domain to list resources |
| 468523 | LICQ-remote-to-user | Gives user privilege remotely by executing arbitrary command on victim machine |
| 7343 | squid-port-scan | Scans network ports on machines which is otherwise inaccessible |
| 2242 | local-setuid-bof | Exploiting buffer overflow on a setuid root file giving super user privilege on a local machine |

FIG. 5

PRE-COGNITIVE SECURITY INFORMATION AND EVENT MANAGEMENT

BACKGROUND

As network hosts continue to grow in number and complexity, organizations that use such network hosts typically face increased vulnerability to targeted and customized attacks. These sophisticated attacks typically combine vulnerabilities that exist on different machines to compromise high value resources in the corporate network. A high value resource may represent any resource for which protection from an attack is needed for an organization. In order to prevent such attacks, organizations typically employ intrusion detection systems (IDSs) that monitor network or system activities for malicious activities or policy violations, and produce reports to a management station.

BRIEF DESCRIPTION OF DRAWINGS

Features of the present disclosure are illustrated by way of example and not limited in the following figure(s), in which like numerals indicate like elements, in which:

FIG. 2 illustrates grouping of levels within an attribute, according to an example of the present disclosure;

FIG. 4 illustrates a network description, according to an example of the present disclosure;

FIG. 5 illustrates vulnerability details, according to an example of the present disclosure;

DETAILED DESCRIPTION

Figure 1:
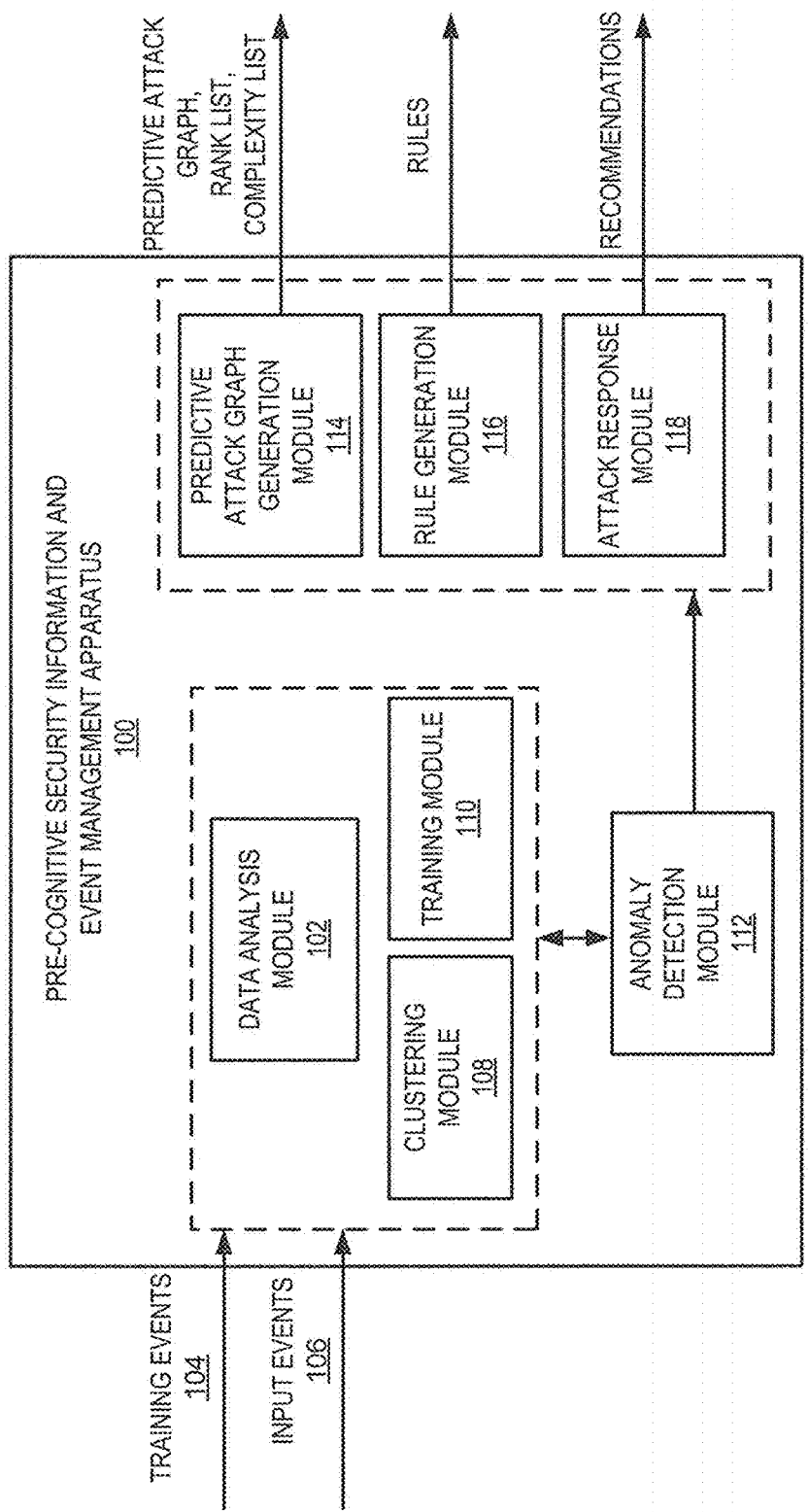
FIG. 1 illustrates an architecture of a pre-cognitive security information and event management (SIEM) apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Typical IDSs that are employed by organizations to prevent network related attacks are reactive in nature and do not make predictions about the near future. While typical IDSs detect well-known intrusions with a high detection rate, detection of novel intrusions, or intrusions that occur over an extended period of time can be challenging. Once an intrusion is detected, it can also be challenging for typical IDSs to create a rule from a known attack pattern. Further, in the event of an attack, it can be challenging for a network administrator to account for factors such as previous attack patterns, current trends, a current network state of servers and machines, and other considerations to determine the best strategy to diminish or end the attack with minimum damage.

According to examples, a pre-cognitive SIEM apparatus and a method for pre-cognitive SIEM are disclosed herein. The aspect of pre-cognition with respect to the apparatus and method disclosed herein may pertain to the prediction of an anomaly and the prediction of a number of assets that can be compromised in the future by the anomalous event, and a difficulty of exploiting vulnerabilities related to services of the assets that can be compromised in the future. Assets may include any network components that may be subject to unauthorized access (e.g., by an unauthorized user, a virus, etc.) or authorized access (e.g., by an authorized user, during normal activity, etc.). SIEM may generally represent software (i.e., machine readable instructions) and products services that combine security information management (SIM) and security event manager (SEM).

Generally, as described herein, the apparatus and method disclosed herein may combine clustering and classification model predictions with predictive attack graphs to explore probabilistic future state transitions of a network with respect to an anomalous event. The apparatus and method disclosed herein may provide a clustering and classification based approach to detect anomalous behavior. According to an example, the apparatus and method disclosed herein provide a fuzzy clustering and artificial neural networks (FC-ANNs) based approach to detect anomalous behavior. The apparatus and method disclosed herein may implement a multi-stage detection process to generate an anomaly score and a score of the severity of an attack. The anomaly score may represent a measure of how unusual an event related to the attack is, or in other words, represent an estimate of the probability of an event being malicious. The score of the severity of the attack may consider the current state, and also future state transitions using a predictive attack graph.

The apparatus and method disclosed herein may receive input data. According to an example, the input data includes events. An event may include any activity (e.g., a connection initiation, a connection denial, a user log-on, etc.) related to a node (e.g., an asset) in a network of interest. For example, an event includes any security-related activity on an asset in a network of interest. The apparatus and method disclosed herein may further receive attributes of the events, correlated events, rules triggered, data monitoring metrics, and partially generated rules. The attributes of the events may include any information related to the events. For example, the attributes include an asset name, an asset identification, etc. The correlated events may include events that are related to or based on other events (e.g., a failed log-in attempt indication after a plurality of failed log-in attempts). The rules triggered may include an indication of any rules that are triggered based on the occurrence of events. The data monitoring metrics may be used to derive statistical information related to occurrence of events over a period of time. The partially generated rules may be used to reduce false positives. For example, if an administrator has set five unsuccessful login failures to trigger a rule, such activities that do not meet this threshold may be used as an indicator to increase prediction accuracies and thus a reduction of false positives related to an event. For example, after a predetermined number of failed log-in attempts, the partially generated rules may provide an indication of a potential attack (e.g., a partial attack), as opposed to an actual indication of an attack. The apparatus and method disclosed herein may further receive data feeds related to the latest threat patterns, software risk scores, information on vulnerabilities of software (i.e., machine readable instructions) and hardware in a network, and sentiment analysis information.

For the apparatus and method disclosed herein, in order to perform an assessment in real-time, events that are related to very well trusted sources may be filtered. The remaining events may then be tested against a series of models to obtain the anomaly score. The apparatus and method disclosed herein may be packaged with semi-supervised and un-supervised learning models (e.g., by using FC-ANNs). An administrator may use one model over another based, for example, on the accuracy of the prediction for a given client domain data.

For the apparatus and method disclosed herein, a predictive attack graph may be used by a network administrator to explore different paths an attacker may take to compromise a high value asset. A high value resource may represent any resource for which protection from an attack is needed for an organization. For example, a high value asset is a database that includes proprietary information related to an organization. The predictive attack graph may predict future paths of an attack based on known vulnerabilities in a network. The predictive attack graph may be built with the knowledge of network topology, services running on different machines, and vulnerabilities that exist in different services. The predictive attack graph may be used to derive a mathematical value based on how many high value assets a malicious event can compromise in the future, how difficult is it to exploit the vulnerabilities from the attacker's standpoint, and how long or how far an attacker has progressed towards compromising the vulnerabilities. The mathematical value may be designated a $\beta$-value. The apparatus and method disclosed herein may report anomalous events with high $\beta$-values to a network administrator. For example, $\beta$-values that exceed a predetermined user-configurable threshold are reported to the network administrator. By reporting anomalous events with high $\beta$-values, the apparatus and method disclosed herein may inform a network administrator of anomalies sooner compared to a system in which events are reported once a high value asset has been compromised.

When it is known that there are paths that may lead an event with malicious intent to compromise high value assets, the apparatus and method disclosed herein may provide for such high value assets to be protected by creating rules based on knowledge of the attack currently in progress. The rules may be designated as ephemeral rules, which last for a very short time (e.g., until the attack has been suppressed). The combination of the clustering and classification model predictions with the predictive attack graph may provide probabilistic future state transitions of a network.

The apparatus and method disclosed herein may implement near-real time incident analysis to analyze data, to add visibility into event patterns, and to correlate sentiment analysis with anomalies. A network administrator may use such features to explore what-if scenarios in a network. The apparatus and method disclosed herein may recommend next steps to an administrator to combat an attack with objectives such as minimizing network downtime, and/or minimizing the net value of compromised assets.

For the apparatus and method disclosed herein, the $\beta$-value may be derived from the predictive attack graph along with the predicted anomaly score increases of the estimated severity of attacks based on probabilistic future states. The apparatus and method disclosed herein may accommodate various clustering and classification techniques, such as, for example, fuzzy processes and neural network activation functions based on client data and domain demands. Further, the apparatus and method disclosed herein may provide for integration of real-time data feed from various sources for sentiment analysis and latest trends.

According to an example, a pre-cognitive SIEM apparatus may include at least one processor, and an anomaly detection module that is executed by the at least one processor to use trained classifiers (e.g., determined by using artificial neural networks (ANNs) as described herein) to detect an anomaly (e.g., a pattern related to a virus, malware, etc., or an outlier from normal behavior as described herein) in input events. The classifiers may be trained to learn patterns of clusters (e.g., determined by using FC as described herein) based on training events. A predictive attack graph generation module that is executed by the at least one processor may generate a predictive attack graph based on the detected anomaly in the input events. The predictive attack graph may provide an indication of different paths that can be taken from a state that is related to the detected anomaly to compromise other selected states related to the state. The other selected states may be selected based on a ranking criterion and a complexity criterion. The predictive attack graph generation module may generate a rank list based on the ranking criterion to include the other selected states, and generate a complexity list based on the complexity criterion to include complexities that are related to vulnerabilities with respect to the other selected states. The predictive attack graph generation module may use the rank list, the complexity list, and a depth of the predictive attack graph to generate a score that provides an indication of a number of states that can be compromised and a difficulty of exploiting vulnerabilities with respect to the states that can be compromised. The depth of the predictive attack graph may represent how many hops an attacker is away from compromising the high value asset.

For the pre-cognitive SIEM apparatus, the apparatus may be similarly applicable to activities instead of states. For example, the states may represent vulnerabilities in an application and the paths that may be taken from one state (vulnerability) to reach another state (vulnerability). The activities may represent any activities or actions related to a state.

According to an example, pre-cognitive SIEM may include using trained classifiers to detect an anomaly in input events. The classifiers may be trained to learn patterns of clusters based on training events. A predictive attack graph may be generated based on the detected anomaly in the input events. The predictive attack graph may provide an indication of different paths that can be taken from an asset that is related to the detected anomaly to compromise other selected assets in a network of the asset, and the other selected assets may be selected based on a ranking criterion and a complexity criterion. A rank list may be generated based on the ranking criterion to include the other selected assets. A complexity list may be generated based on the complexity criterion to include complexities that are related to vulnerabilities that exist in services with respect to the other selected assets. The rank list, the complexity list, and a depth of the predictive attack graph may be used to generate a score that provides an indication of a number of assets that can be compromised and a difficulty of exploiting vulnerabilities related to services of the assets that can be compromised.

FIG. 1 illustrates an architecture of a pre-cognitive SIEM apparatus (hereinafter also referred to as "apparatus 100"), according to an example of the present disclosure. Referring to FIG. 1, the apparatus 100 is depicted as including a data analysis module 102 to receive training events 104. The data analysis module 102 may deduce, cleanup, and standardize attribute values from the training events 104. The training events 104 may be common event format (CEF). Similarly, the data analysis module 102 may receive input events 106, and deduce, cleanup, and standardize attribute values from the input events 106.

A clustering module 108 is to receive the training events 104 with selected attributes, and divide the training events 104 into a predetermined number of clusters (e.g., k clusters) so that there is homogeneity within the clusters, and heterogeneity between clusters.

A training module 110 is to train a plurality of classifiers to learn patterns of the predetermined number of clusters. Generally, some of the plurality of trained classifiers may be used for anomaly detection. When a plurality of the trained classifiers is used, the trained classifiers may be aggregated using a common aggregation model.

An anomaly detection module 112 is to operate in conjunction with the training module 110 to detect an anomaly in one of the input events 106.

A predictive attack graph generation module 114 is to generate a predictive attack graph based on the detected anomaly in the input event, and the future possible steps the anomaly may take or include.

A rule generation module 116 is to generate a rule based on knowledge of the attack. According to an example, the generated rule is an ephemeral rule. Ephemeral rules may communicate with a software defined network (SDN) or IDS to block specific flow of traffic.

An attack response module 118 is to operate in conjunction with the predictive attack graph generation module 114 to generate recommendations to combat the attack based on different real-time objectives.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

For the apparatus 100 disclosed herein, generally the anomaly detection functionality may be trained using events that have occurred in the recent past. The data analysis module 102 may receive input events 106. The data analysis module 102 may deduce, cleanup, and standardize attribute values from the input events 106. The input events 106 may be common event format input events. Each event $E_i$ may include attributes $\{A_1, A_2, \ldots, A_n\}$ in either numeric or nominal form. An event may include any activity (e.g., a connection initiation, a connection denial, a user log-on, etc.) related to a node in a network of interest. For example, an event includes any security-related activity on a node in a network of interest. Attributes may include any information related to an event, such as, for example, a host identification (ID) related to a connection initiation, a user ID related to a user log-on, etc. The possible levels within an $A_i$ attribute may be grouped together into similar meaningful taxonomy nodes to derive statistical values.

FIG. 2 illustrates grouping of levels within an attribute, according to an example of the present disclosure. Referring to FIG. 2, the attribute "Category Significance" may include thirteen possible values or levels, and these possible values may be classified into four meaningful groups (e.g., compromise, hostile, recon, and info). If needed coding and scaling may be performed on the input events 106. Coding is an analytical process in which data, in quantitative form or qualitative form, is categorized to facilitate analysis. Coding may represent the transformation of data into a form understandable by machine readable instructions. If variables are of incomparable units or of the same units but show different variances, the variables may be standardized before clustering.

For the input data 104, dimensional reduction may be performed using principal component analysis (PCA) or multiple correspondence analysis (MCA) to detect and represent underlying structures in a data set. The dimensional reduction may be performed by representing data as points in a low-dimensional Euclidean space. By analyzing eigenvectors showing highest variance and input data plotted after dimensionality reduction, a number of dimensions N that are to be used from the input data, and a number of clusters K to group the data may be determined.

The clustering module 108 may receive training events 104 with selected attributes, and divide the training events 104 into a predetermined number of clusters (e.g., k clusters) so that there is homogeneity within the clusters, and heterogeneity between clusters. The attributes may be selected from the common event format training events 104. The training events may be designated as $D=\{E_1, E_2, \ldots E_h\}$, with attributes $\{A_1, A_2, \ldots, A_n\}$.

For an example of an implementation of the clustering module 108 using fuzzy c-means clustering, the training events may be input into the clustering module 108 and divided into a predetermined number of clusters (e.g., k clusters). Thus, the data in the same cluster should be as similar as possible, and data belonging to different clusters should be as different as possible. The clusters may represent meaningful aspects related to the data. For example, the clusters may represent worms, viruses, normal activity, etc. Each data point may be located in n-dimensional Euclidian space, with each dimension corresponding to the n different attributes of the data point.

Generally, with respect to fuzzy c-means based implementation of the clustering module 108, every point has a degree of belonging to clusters, as in fuzzy logic, rather than belonging completely to just one cluster. Thus, points on the edge of a cluster may be in the cluster to a lesser degree than points in the center of cluster. With respect to fuzzy c-means, the centroid of a cluster is the mean of all points, weighted by their degree of belonging to the cluster.

The use of soft (fuzzy) clustering may allow membership levels for each event with many clusters. Other options for clustering may include Fuzzy clustering by Local Approximation of MEmberships (FLAME) based implementation of the clustering module 108. For FLAME clustering, clusters may be defined in the dense parts of a dataset and cluster assignment may be performed solely based on the neighborhood relationships among objects. The neighborhood relationships among neighboring objects in the feature space may be used to constrain the memberships of neighboring objects in the fuzzy membership space.

For an example of an implementation of the clustering module 108 using fuzzy c-means clustering, the clusters may be aggregated using a generalized least-squares objective function. The clusters may provide for the corroboration of known substructures or suggestion of a substructure in unexplored data. For the example of the implementation of the clustering module 108 using fuzzy c-means clustering, $E_m$ may be represented as follows:

$$E_m = \sum_{i=1}^{k} \sum_{j=1}^{n} \mu_{ij}^m \|x_i - v_j\|^2 \quad \text{Equation (1)}$$

$$1 \leq m < \infty$$

For Equation (1), $E_m$ represents an objective function for fuzzy c-means clustering, which will find cluster centers by iteratively adjusting their positions, $\mu_{ij}^m$ may represent the degree of membership of $x_i$ in the cluster j, $x_i$ may represent the $i^{th}$ dimensional measured data, $v_j$ may represent the $j^{th}$-dimensional center of a cluster, and $\|*\|$ may represent any norm expressing the similarity between any measured data and center.

For the example of the implementation of the clustering module 108 using fuzzy c-means clustering, fuzzy partitioning may be performed through an iterative optimization of the object function for Equation (1), with the update of membership $\mu_{ij}$ and the cluster centers $v_j$ provided as follows:

$$\mu_{ij} = \frac{1}{\sum_{p=1}^{k} \left(\frac{\|x_i - v_j\|}{\|x_i - v_p\|}\right)^{\frac{2}{m-1}}} \quad \text{Equation (2)}$$

$$v_j = \frac{\sum_{i=1}^{n} \mu_{ij} x_i}{\sum_{i=1}^{n} \mu_{ij}}$$

The iteration may stop when: $\max_{ij}\{|\mu_{ij}^{q+1} - \mu_{ij}^q|\} < \varepsilon$, where $\varepsilon$ represents the termination criterion between 0 and 1, and q represents the iteration steps.

The training module 110 may train a plurality of classifiers to learn patterns of the predetermined number of clusters generated by the clustering module 108. Generally, different classifiers may be trained to understand the relationship between dimensions and test (e.g., by k-fold cross validation) the accuracy of the predictions of the training module 110 before choosing a trained classifier. According to an example, ANNs are used for classification for the training module 110. For ANN, the training module 110 may train neurons to learn the pattern of k-clusters using feed forward neural networks (FFNNs) trained with a back-propagation process. The ANN classifier process may implement a two layer FFNN with a sigmoid activation function for the hidden layer, and soft-max function for the output layer. The use of the soft-max function provides for interpretation of the outputs as probabilities. For the ANN, each node i in the input layer (relating to an attribute) may have a value $x_i$ as the network's input, which is multiplied by a weight value between the input layer and the hidden layer. Each node in the hidden layer may receive the signal $\Psi(j)$, which is then passed through the bipolar sigmoid activation function f(x), and soft-max function g(x) as follows:

$$g(Y_q) = \frac{e^{y_q}}{\sum_{i=1}^{k} e^{y_i}} \quad \text{Equation (3)}$$

$$y_k = \Theta_k + \sum_{j=1}^{m} w_{jk} f(\Psi(j)) \quad \text{Equation (4)}$$

$$\Psi(j) = \Theta_j + \sum_{i=1}^{n} x_i w_{ij} \quad \text{Equation (5)}$$

$$f(x) = \frac{2}{(1 + e^{-x})} - 1 \quad \text{Equation (6)}$$

For Equations (3)-(6), $\Theta_k$ and $\Theta_j$ may represent the biases in the hidden layer, $Y_k$ may represent the input value for soft-max function g(x) that maps a length-p vector of real values to a length-k vector of values (defined as Equation 3; since the vector sums to one and all its elements are strictly between zero and one, they represent a probability distribution), $W_{ij}$ may represent the weights for each node, i-th input layer and j-th hidden layer, $W_{jk}$ may represent the weights for each node, j-th hidden layer and k-th output layer (these may be derived from Gradient descent), $y_k$ may represent the output of k-th neuron before application of the soft-max function, and $Y_q$ may represent the output of q-th neuron after application of the soft-max corresponding to $y_k$.

As described herein, for the ANN, each node i in the input layer (relating to an attribute) may have a value $x_i$ as the network's input, which is multiplied by a weight value between the input and the hidden layer. In order to optimize weights, the training module 110 may use a gradient descent process to search for the global optimum of the network weights (including insights from the predictive attack graph). The training module 110 may determine partial derivatives $$\frac{\partial E}{\partial w}$$

for each weight in the network, and adjust the weights as follows:

$$W(t+1) = W(t) - \eta \frac{\partial E(t)}{\partial w(t)} + \alpha \cdot \Delta W(t) \quad \text{Equation (7)}$$

For Equation (7), $\eta$ may represent the learning rate, t may represent the number of epochs, $\alpha$ may represent the convergence of error acceleration factor, and W(t) may represent the weight value derived after the t-th iteration.

The training module 110 may also employ semi-supervised training methods, for which the training data include labeled instances of normal behavior. In this regard, Naïve Bayes may be used to learn normal behavior from a small labeled dataset, and then extended to the large unlabeled dataset using the expectation-maximization (EM) iterative clustering process. The Naïve Bayes classifier is a probabilistic classifier based on applying Bayes' theorem with strong (naive) independence assumptions. Further, the expectation-maximization (EM) process is an iterative method for finding maximum likelihood or maximum a posteriori (MAP) estimates of parameters in statistical models, where the model depends on unobserved latent variables.

The anomaly detection module 112 may operate in conjunction with the training module 110 to detect an anomaly in one of the input events 106. For a plurality of anomalies, the anomaly detection module 112 may list anomalies in decreasing order of anomaly score and severity score. The anomaly detection module 112 may aggregate results from every ANN, and apply the Dempster-Shafer theory (DST) to deduce the anomaly score and severity score. DST may generally allow for the combination of evidence from different sources and arrival at a degree of belief (represented by a belief function) that takes into account all the available evidence. The anomaly score may be determined by aggregating and validating outputs of multiple ANNs or multiple classifiers. According to an example, if ANN1 which represents label1 (e.g., worm-A) claims that it has a 70% match, ANN2 which represents label2 (e.g., normal activity) claims that it has a 10% match, ANN3 which represents label3 (e.g., worm-B) claims that it has a 60% match, and if an administrator has setup the confidence threshold at 50%, the ANN2 claim will not be given importance, and the ANN1 and ANN3 claims will be aggregated. Based on a past error rate (ER) from ANN1 and ANN3, (e.g., ANN1 ER is 10% and ANN3 ER is 5%), a weighted average may be taken and rounded. The rounded value may be shown to an administrator as 64% of this event being an anomaly, with the potential to match worm-A and worm-B.

Generally, the anomaly detection module 112 may analyze the input events 106 to detect outliers in the input events 106 using clusters generated by the clustering module 108 and/or the neurons trained by the training module 110. For example, the anomaly detection module 112 may determine how a particular data point is located in the n-dimensional Euclidian space, and/or a degree by which an event (of the input events 106) deviates from normal behavior. As described herein, an administrator may explore future states of the network for a given list of anomalies. The information about future states may include actions an attacker may take from the current network state, vulnerabilities that the attacker can exploit, and assets the attacker may compromise.

The predictive attack graph generation module 114 may generate a predictive attack graph based on the detected anomaly in one of the input event 104. The predictive attack graph may indicate different paths an attacker may take to compromise a high value asset. An administrator may explore future states of the attack by exploring the vulnerabilities the attack may exploit. As described herein, a predictive attack graph may use elements related to and including asset $A_i$, service $S_i$, vulnerability $\{V_i\}$, network connection NC, attacker state X, and exploitation of a vulnerable asset. The asset $A_i$, service $S_i$, and vulnerability $\{V_i\}$ may represent a static component (e.g., the static network topology) of the predictive attack graph, and the network connection NC may represent the real-time component of the predictive attack graph.

An asset $A_i$ may be defined as a tuple <asset-ID, name, sub-sys-ID, $\{S_i\}$, $\{V_i\}$, rank>. For the asset $A_i$, the asset-ID may represent the ID of the asset, name may represent the name of the asset, sub-sys-ID may represent the ID of the sub-system containing the asset, $\{S_i\}$ may represent the list of services that are hosted by the asset, $\{V_i\}$ may represent the list of known vulnerabilities for the asset, and rank may represent the rank of the asset. For the rank, the rank may increase as the value of the asset increases. For example, on a scale of 1-10, a general purpose rank-5 database has a lower rank compared to a rank-10 database that stores proprietary information for an organization. According to an example, asset $A_i$ is represented as <7231, Vertical 1-Web-Server, DMZ3, 101, 1001, 8>.

A service $S_i$ may be defined as a tuple <service-ID, name, protocol, port, privilege>. For the service $S_i$, the service-ID may represent the ID of the service, name may represent the service name, protocol may represent the protocol associated with the service, port may represent the port number used by the service, and privilege may represent the privilege that is needed to use the service. According to an example, service $S_i$ is represented as <101, IIS webservice, HTTP, 80, user>.

A vulnerability $\{V_i\}$ may be defined as a tuple <v-ID, name, S, range, elev-privilege, complexity>. For the vulnerability $\{V_i\}$, v-ID may represent the vulnerability ID, name may represent the name of the vulnerability, S may represent the service that may be compromised by the vulnerability, range may represent the exploiting range of the vulnerability {local, remote}, elev-privilege may represent the obtained privilege by successfully exploiting this vulnerability {Y/N}, and complexity may represent the complexity level of the vulnerability (used to measure the difficulty degree of exploiting the vulnerability), measured in probability (e.g., 0% for easy-100% for very difficult). According to an example, vulnerability $\{V_i\}$ is represented as <1001, IIS Buffer overflow, IIS webservice, local, Y, 50%>.

A network connection NC may be defined as a tuple <$A_s$, $A_d$, $S_i$>. For the network connection NC, $A_s$ may represent the source asset ID, $A_d$ may represent the destination asset ID, and $S_i$ may represent the service being accessed by $A_s$. According to an example, network connection NC is represented as <7231, 7232, 102>.

An attacker state X may be defined as a tuple <$A_a$, privilege>. For the attacker state X, $A_a$ may represent the compromised host ID, and privilege may represent the privilege that the attacker has owned on this host. According to an example, attacker state X is represented as <7231, root>.

Exploitation of a vulnerable asset may be defined as a tuple <pre-condition ($A_a$), post-condition ($A_a$)>. For exploitation of a vulnerable asset, $A_a$ may represent the asset that may be compromised, pre-condition may represent the set of preconditions required to compromise an asset, and post-condition may represent the state of a compromised asset. According to an example, exploitation of a vulnerable asset is represented as <Direct Executable Buffer overflow, Root (A_a)>. With respect to Direct Executable Buffer Overflow, the uploaded (and possibly transformed) string may include instructions and/or addresses.

The predictive attack graph generation module 114 may use elements related to and including asset $A_i$, service $S_i$, vulnerability $\{V_i\}$, network connection NC, attacker state X, and exploitation of a vulnerable asset to generate the predictive attack graph. Generally, the predictive attack graph generation module 114 may collect all network elements related to and including asset $A_i$, service $S_i$, vulnerability $\{V_i\}$, network connection NC, attacker state X, and exploitation of a vulnerable asset. The network elements may be collected at any given time, and/or when a network state changes.

Figure 3:
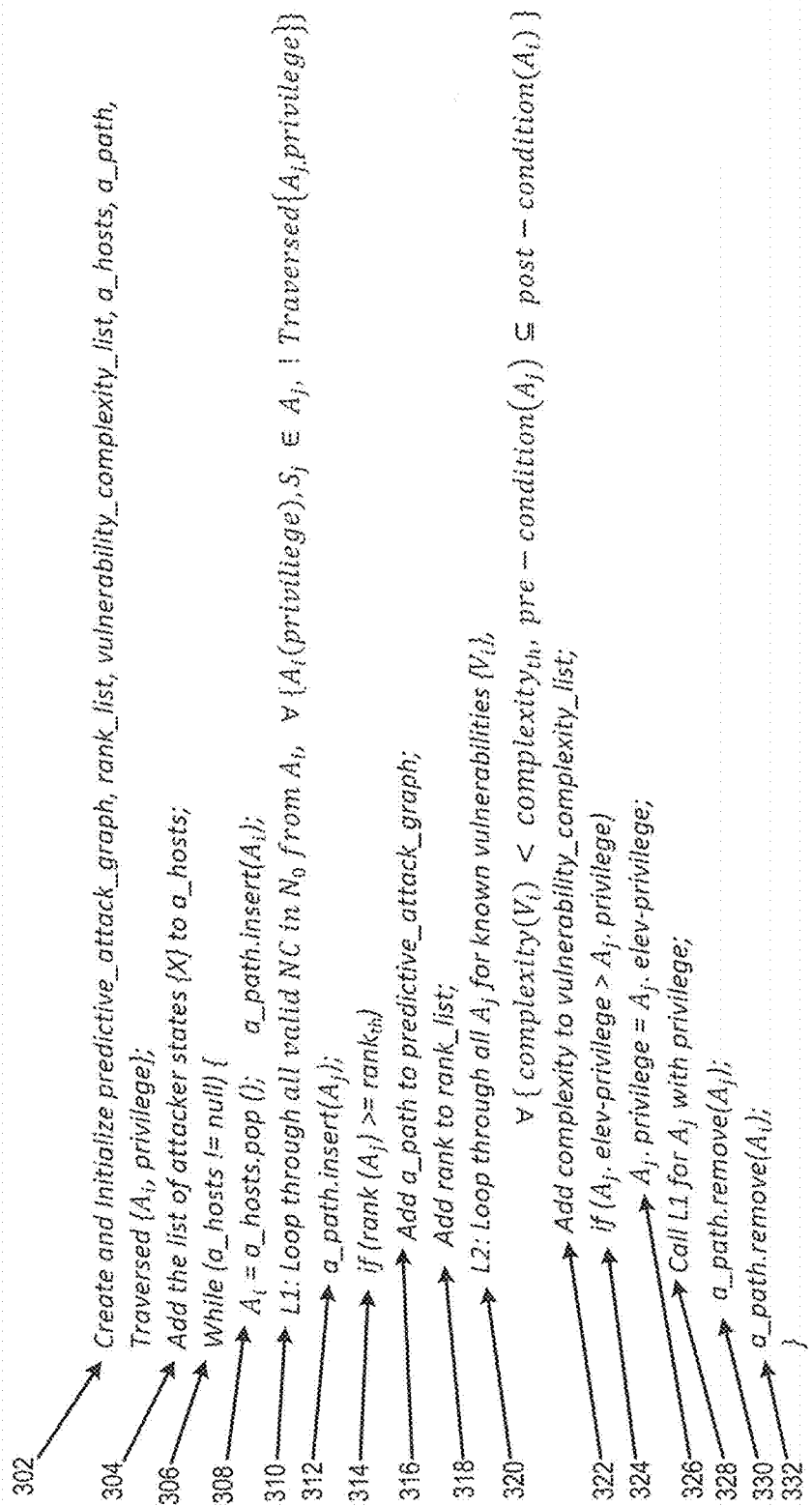
FIG. 3 illustrates pseudo-code for generation of a predictive attack graph, according to an example of the present disclosure.

FIG. 3 illustrates pseudo-code 300 for generation of a predictive attack graph, according to an example of the present disclosure. The predictive attack graph generation module 114 may use the pseudo-code 300 for generation of a predictive attack graph, and further, for generation of a rank_list and a vulnerability_complexity_list. The predictive attack graph generation module 114 may further determine the β-value using the rank_list and the vulnerability_complexity_list, and depth of the predictive attack graph (i.e., how many hops the attacker is away from compromising a first high value asset in the predictive attack graph). The rank may reflect a value of a machine from a network administrator standpoint (e.g., higher rank for a higher value machine), and the complexity may reflect how difficult it is to exploit the vulnerability from an intruder standpoint. The rank_list may include all high value assets that are identified in the predictive attack graph. The vulnerability_complexity_list may include a list of vulnerabilities for each service in the high value asset that has a vulnerability path (e.g., what is the complexity of the vulnerability that can be exploited).

For the predictive attack graph generation module 114, inputs to the predictive attack graph generation module 114 may include {X}, $N_0$ (initial network state), $rank_{th}$, and $complexity_{th}$. The $rank_{th}$ and $complexity_{th}$ may respectively represent rank and complexity thresholds. Outputs of the predictive attack graph generation module 114 may include the predictive attack graph, the rank list, and the complexity list. Further, the predictive attack graph generation module 114 may also determine the β-value as described herein.

As described herein, the pseudo-code 300 may be applicable to assets as illustrated in FIG. 3, and similarly to activities or states that are related to or independent of assets.

Referring to FIG. 3, for the pseudo-code at 302, the predictive_attack_graph, rank_list, vulnerability_complexity_list, a_hosts, a_path, and Traversed $\{A_i, privilege\}$ may be created and initialized. The elements a_hosts, {X}, $N_0$(initial network state), $rank_{th}$, and $complexity_{th}$ may represent the input to the pseudo-code 300 for generation of the predictive attack graph. The Traversed $\{A_i, privilege\}$ may represent the asset that has been traversed, and the associated privilege (e.g., user, administrator, etc.) that has been used to traverse that asset. The a_hosts may include all assets in a network that are under consideration. The a_path may include a current path associated with an asset in the network that is under consideration.

The pseudo-code at 304, the list of attacker states {X} may be added to a_hosts. Thus, a plurality of assets that have been compromised may be analyzed to create the predictive attack graph for each of the compromised assets, as opposed to a single predictive attack graph for each asset that is compromised.

The pseudo-code at 306, the loop While (a_hosts!=null) may be initiated. Thus all assets in a_hosts may be evaluated with respect to creation of the predictive attack graph, and generation of the rank list and the complexity list.

The pseudo-code at 308 ($A_i$=a_hosts.pop( ) and a_path.insert($A_i$)) may take each asset from the a_hosts, and insert it into a_path to loop through all flows from that particular asset through any possible port or service connections.

The pseudo-code at 310 (L1: Loop through all valid NC in $N_0$ from $A_i$, $\forall\{A_j(privilege), S_i \in A_j,$ ! Traversed $\{A_j, privilege\}\}$) may evaluate all valid network connections that may occur in $N_0$ from $A_i$, with the same privilege that belongs to all the services within $A_j$.

The pseudo-code at 312 (a_path.insert($A_j$)) may insert all assets $A_j$ in the attack path a_path that meet the criteria mentioned at 310.

The pseudo-code at 314 (if (rank($A_j$)>=$rank_{th}$)) may be used to determine whether the rank of an asset $A_j$ is greater than or equal to the rank threshold. In other words, the pseudo-code at 314 (if (rank($A_j$)>=$rank_{th}$)) may be used to determine whether the asset $A_j$ is a high value asset.

For the pseudo-code at 316 (Add to a_path to predictive_attack_graph), in response to a determination that the rank of an asset $A_j$ is greater than or equal to the rank threshold, the particular asset $A_j$ determined at 314, and the path to it from a_path, may be added to the predictive attack graph along with the associated path.

For the pseudo-code at 318 (Add rank to rank_list), in response to a determination that the rank of an asset $A_j$ is greater than or equal to the rank threshold, the particular asset $A_j$ determined at 314 may be added to the rank list.

For the pseudo-code at 320 (L2: Loop through all $A_j$ for known vulnerabilities $\{V_i\}$, $\forall\{complexity(V_i)<complexity_{th},$ pre-condition($A_j$)⊆post-condition($A_i$)}), the vulnerabilities of the assets $A_j$ may be evaluated. For example, a determination may be made as to whether the complexity of a vulnerability in an asset $A_j$ is less than the complexity threshold, so that attackers may take that route. If the threshold set by an administrator is high (e.g., include all vulnerabilities that have less than a 90% chance to be exploited), then the predictive attack graph may be relatively large as it covers almost all vulnerabilities. Additionally, a determination may be made as to whether a pre-condition for asset $A_j$ matches a post-condition for asset $A_j$.

For the pseudo-code at 322 (Add complexity to vulnerability_complexity_list), in response to a determination that the complexity of the asset $A_j$ is less than the complexity threshold, and a pre-condition for asset $A_j$ matches a post-condition for asset $A_i$, the complexity related to the asset $A_j$ may be added to the complexity list.

For the pseudo-code at 324 (if ($A_j$. elev-privilege>$A_j$. privilege)), a determination may be made as to whether the elev-privilege for asset $A_i$ is greater than the privilege for asset $A_j$.

For the pseudo-code at 326 ($A_j$. privilege=$A_j$. elev-privilege), in response to a determination that the elev-privilege for the user (e.g., attacker) for asset $A_j$ is greater than the privilege for the user (e.g., attacker) for asset $A_j$, the privilege for the user (e.g., attacker) for asset $A_j$ may be set to the elev-privilege for the user (e.g., attacker) for asset $A_j$.

For the pseudo-code at 328 (Call L1 for $A_j$ with privilege), in response to determination of all possible vulnerabilities that can be exploited and whether any elevation in user privileges can be achieved, the process may be routed to 310.

For the pseudo-code at 330 (a_path, remove($A_j$)) with respect to a Depth First Search, in order to retract back to the previous node, as all possible connections in the current node have been explored, $A_j$ may be removed from the a_path.

For the pseudo-code at 332 (a_path,remove($A_i$)), after completing all possible paths from the given compromised asset, the compromised asset may be removed from the a_path.

Figure 6:
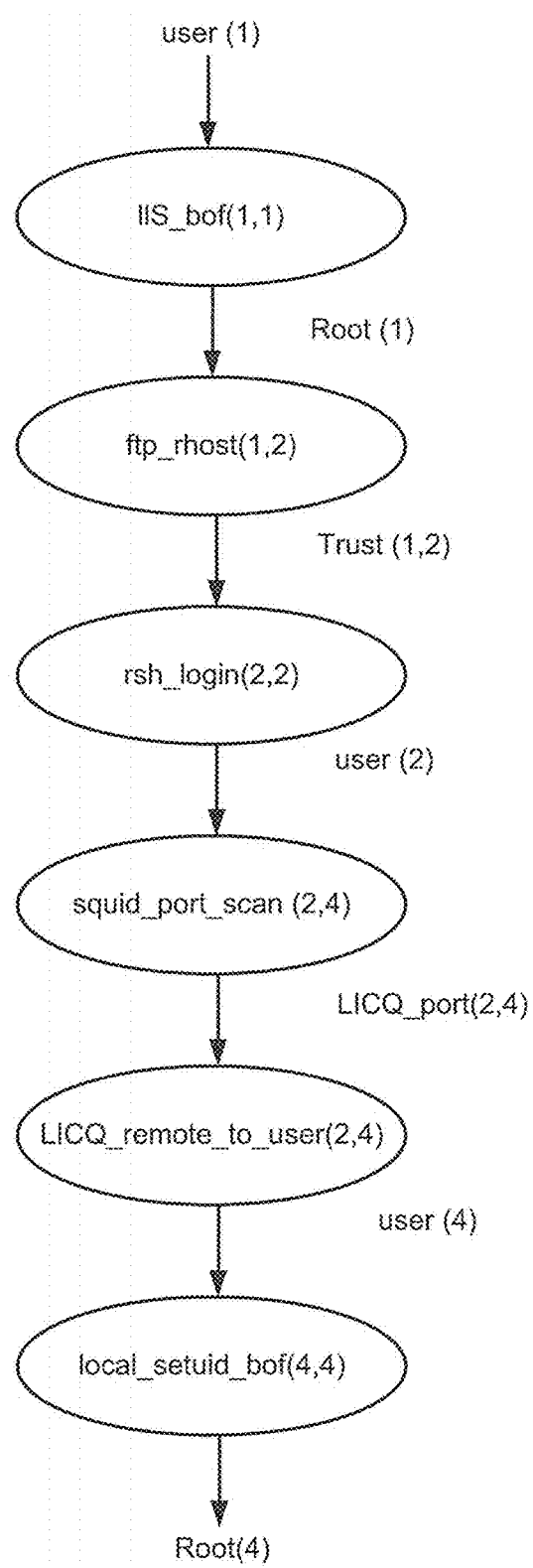
FIG. 6 illustrates a predictive attack graph for an anomaly identified in a network, according to an example of the present disclosure.

With respect to the predictive attack graph generated by the predictive attack graph generation module 114, each edge in the predictive attack graph may be chosen based on the success probability (i.e., complexity) of reaching the edge. FIG. 4 illustrates a network description, and FIG. 5 illustrates vulnerability details, according to an example of the present disclosure. For the example of FIGS. 4 and 5, the network represented in FIG. 4 includes four hosts separated from the Internet by a firewall. The hosts may be respectively represented by asset IDs A1, A2, A3, and A4. The firewall may allow external hosts to connect to an Internet Information Services (IIS) web server running on port 80 on the host A1. Internal hosts may be allowed to connect to any port within the network. One possible path in the predictive attack graph is shown in FIG. 6 from user(1) to root(4) to compromise the high value asset that has proprietary information. Generally, FIG. 4 illustrates the connectivity, and FIG. 5 (Effects/Elevated Privilege column) explains the vulnerabilities. FIGS. 4 and 5 may be combined to generate FIG. 6. In order for an attacker who compromises A1 to use the vulnerabilities mentioned in FIG. 5 to travel through the predictive attack graph in FIG. 6 and compromise A4, an attacker may exploit buffer overflow vulnerability in the IIS web server and gain administrative privileges, and stop or start any service the attacker wants in that machine, or perform LFI (local file injection) and RCE (remote command execution). As this machine is not the target, the attacker may explore other machines to see valuable assets. As part of the attacker's exploration, the attacker may find out that a remote login trust relationship may be established by creating a .rhost file in the ftp home directory of A2. Then, using the existing login trust relationship, the attacker may log into A2 without providing a password. From A2, the attacker may perform a port scan to identify, and by using, for example, LICQ, remote attackers may execute arbitrary commands (via shell metacharacters in a uniform resource locator (URL) to gain user privileges, and exploit a setuid buffer overflow in the target machine. Considering all the high value assets that may be compromised from rank list, the difficulty of exploiting the vulnerabilities from vulnerability_complexity_list, and the depth of the predictive attack graph, the β-value may be derived. By reporting anomalous events with high β-values, the apparatus 100 may present the anomalies sooner to the network administrator compared to a system in which events are reported once an asset has been compromised.

With respect to the β-value determination, assume that in a predictive attack graph a high value asset with a rank of 9 (i.e., rank-9) may be compromised by an anomalous event, with difficulty levels from reaching the asset being specified as Hop-1=40%, Hop-2=70%, Hop-3=80%, and Hop-4=60%. Given a complexity threshold of 50%, the β-value may be determined as follows. Hop 1 is below the complexity threshold, and since it is the first hop, Hop 1 may be assigned a 100% probability that an attacker may compromise this asset. Hop 2 is above the complexity threshold, and therefore Hop 2 is assigned a 54% probability that an attacker may compromise this asset (e.g., ((100−70)*2)/10*rank). In the same manner, Hop-3 and Hop-4 are respectively assigned a 36% and a 72% probability that an attacker may compromise these assets. Because of the multiple hops to reach the high value asset, a split of 40/30/20/10 (based on reaction time) may be assigned for Hop-1 to Hop-4. This equates to 100% of 40, 54% of 30, 36% of 20 and 72% of 10, which results in a β-value of 71%. In general, an order to calculate the β-value, a number of high value states (e.g., assets, activities, vulnerabilities) in the predictive attack graph may be determined. The weighted complexity level of traversal from a current state to subsequent states in the predictive attack graph may be summed. A number of hops (or depth of the predictive attack graph) the attacker is away from a current state to a high value state in the chain may be determined. The weighted value, which includes the complexity level as well as a relevance (e.g., high/low) of a state, corresponding to all of the states that can be reached from a current state may be determined. Finally, for network based predictive attack graphs, if compromising one of the high value assets in the path can result in bringing down a running service or damaging an asset, the expected network downtime may be calculated, or the value of the asset may be determined and provided as an input to the attack response module 118.

Figure 7:
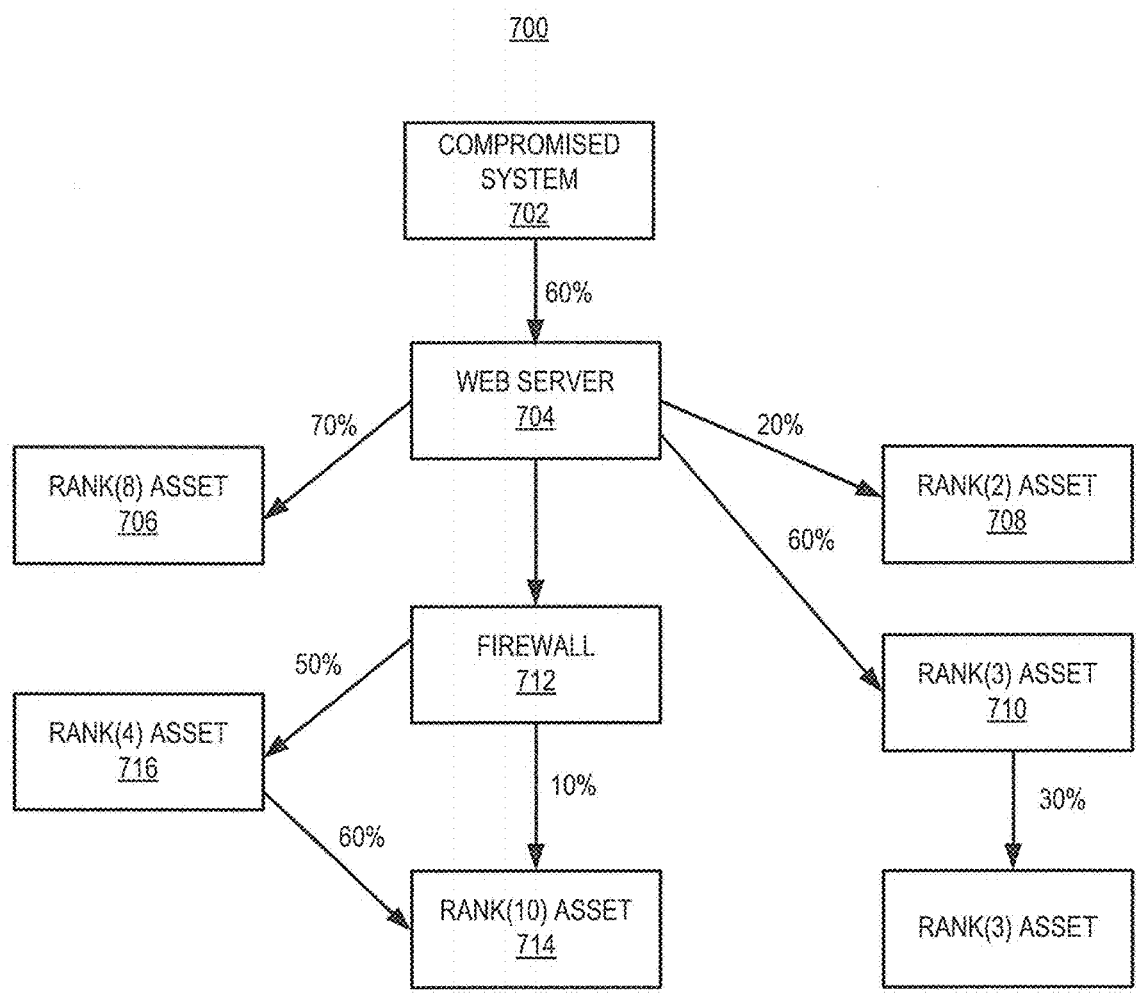
FIG. 7 illustrates another predictive attack graph for an anomaly identified in a network, according to an example of the present disclosure.

FIG. 7 illustrates another predictive attack graph 700 for an anomaly identified in a network, according to an example of the present disclosure. For the predictive attack graph of FIG. 7, assuming an attacker has compromised a first system 702 which has connections to the web server 704, by exploiting vulnerabilities in the web server, the attacker may either compromise a rank-8 database (e.g., at 706) with a higher probability to exploit, or the attacker may compromise other low priority systems with less probability (e.g., at 708, 710). However, when the attacker crosses the firewall at 712, the attacker may log into a different demilitarized zone (DMZ) which has the highest value rank-10 asset (e.g., at 714) of the organization. Though this highest value rank-10 asset is highly unlikely to be directly compromised through the firewall, an attacker may compromise a rank-4 machine (e.g., at 716) in the same DMZ, and using the already established connection between the machines, the attacker may compromise the highest value rank-10 asset of the organization.

The rule generation module 116 may generate a rule based on knowledge of the attack. According to an example, the generated rule is an ephemeral rule. When it is known that there are paths that may lead an event with malicious intent to compromise high value assets, those high value assets may be protected by creating rules based on the knowledge of the attack. For example, the rules may be created in real-time based on knowledge of the attack in process. According to an example, the rules are used to block certain flow of traffic through connected firewalls. According to another example, the rules are used to make access to certain high value assets hypersensitive for specific flow of traffic. For example, for certain high value assets, login failure thresholds may be lowered. Alternatively or additionally, for certain high value assets, specific flow of traffic may be blocked. For example, if a first asset has been compromised, based on the knowledge of an attack, access to a high value asset that is linked to the first asset may be further restricted, with the restrictions being further amplified compared to access to the high value asset prior to the knowledge of the attack. Once the attack has been suppressed, the rules may also be removed so as to remove any of the added restrictions on the high value asset. According to another example, if it is known that IP x.x.x.x is one step away from being compromised, and through which an attacker may communicate to a high value asset (e.g., a rank 10 asset), access to this IP address may be blocked through rules or SDN. The rules may also be used to monitor certain suspicious activity closely, and alert the user of a system when the suspicious activity score exceeds a predetermined threshold. At an even higher threshold, automated action may be implemented.

Referring again to FIG. 6, an attacker who compromises Host-1 (e.g., Asset ID A1) may travel through the predictive attack graph to compromise the Host-4 database, which is a high value asset. If the network state of Host-1 is compromised, the β-value may instantly accelerate the severity of the attack in place. In this regard, the rule generation module 116 may also suggest/create ephemeral rules for Host-4 using complete details of the attack in hand.

Figure 8:
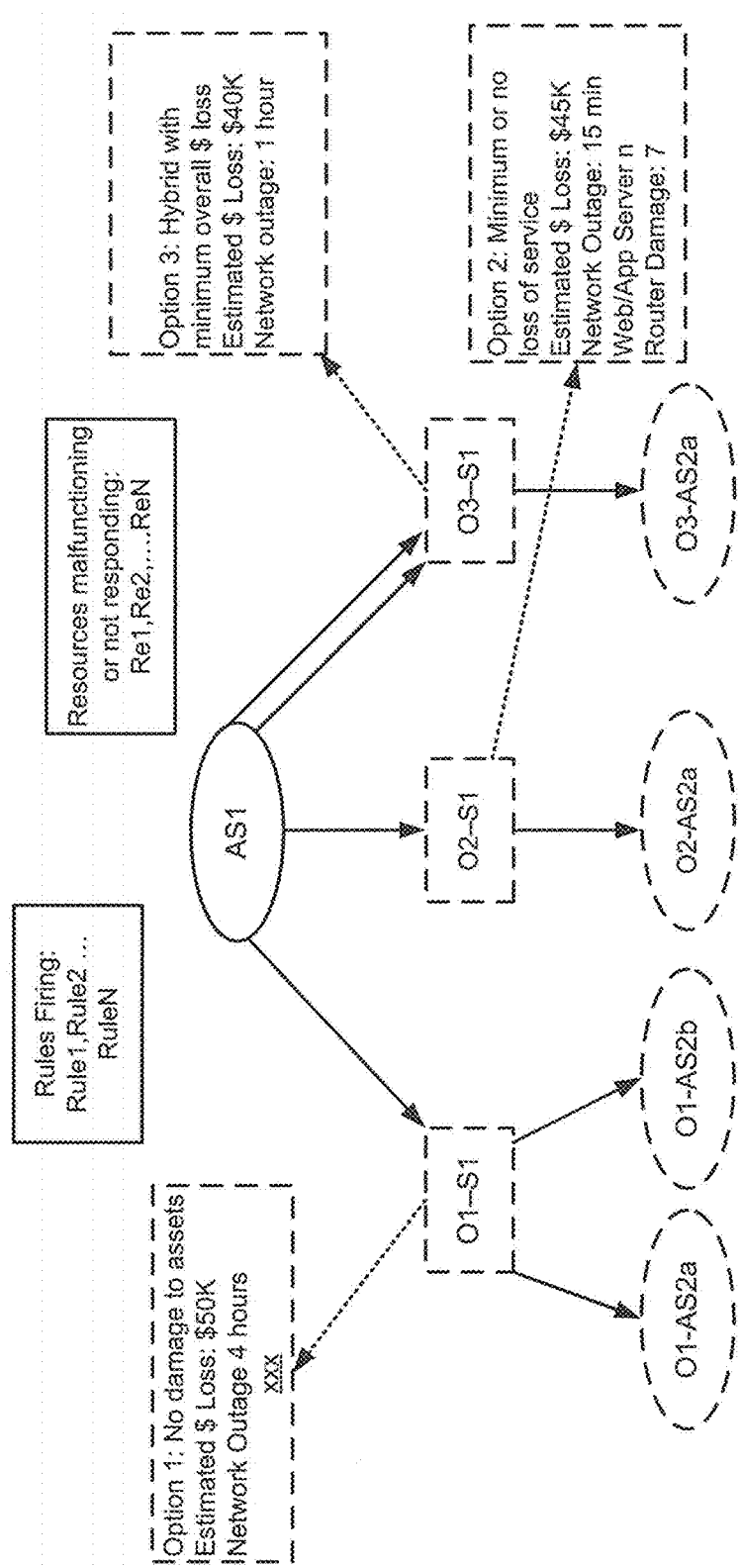
FIG. 8 illustrates a diagram of pre-cognitive SIEM recommendations to combat an attack, according to an example of the present disclosure.

FIG. 8 illustrates a diagram of pre-cognitive SIEM recommendations to combat an attack, according to an example of the present disclosure. The attack response module 118 is to generate recommendations to combat an attack based on different real-time objectives. As shown in FIG. 8, the attack response module 118 may generate recommendations of next steps to a network administrator to combat the attack with different real-time objectives. The generated recommendations may be provided in an illustrative format as shown in FIG. 8. For FIG. 8, AS may represent attacker state, O1-S1, O2-S1, and O3-S1 may represent future options that may be taken by an administrator to combat or suppress an attack, and Oy-ASx may represent possible attacker state x after taking option y. Further, for FIG. 8, the solid borders may represent current or past states, and the broken borders may represent future or predicted states. The pre-cognitive SIEM recommended action may be represented by a double arrow.

Referring to FIG. 8, for each anomaly, the attack response module 118 may provide n-solutions to an administrator. Each generated solution which represents an edge of the predictive attack graph of FIG. 8 may include an objective and an optimization process which uses a greedy approach to solve the current system state biased towards the chosen objective. For example, after an attack (AS1), option 1 (O1) may represent potential loss of service with minimum or no damage to physical assets. Option 2 (O2) may represent minimum or no loss of service. Option 3 (O3) may represent a hybrid option with minimum overall monetary loss. Based on the option that is selected (e.g., O1, O2, or O3), the attack response module 118 may also provide the future possible moves of the attacker (e.g., O1-AS2*a*, O1-AS2*b*, O2-AS2*a*, or O3-AS2*a*). The future possible moves of the attacker may represent probabilistic future states of the attack. The attack response module 118 may thus provide a holistic view of an attack, related options to address the attack, and future possible moves of the attacker, to thus facilitate preemptive actions by an administrator.

Figure 9:
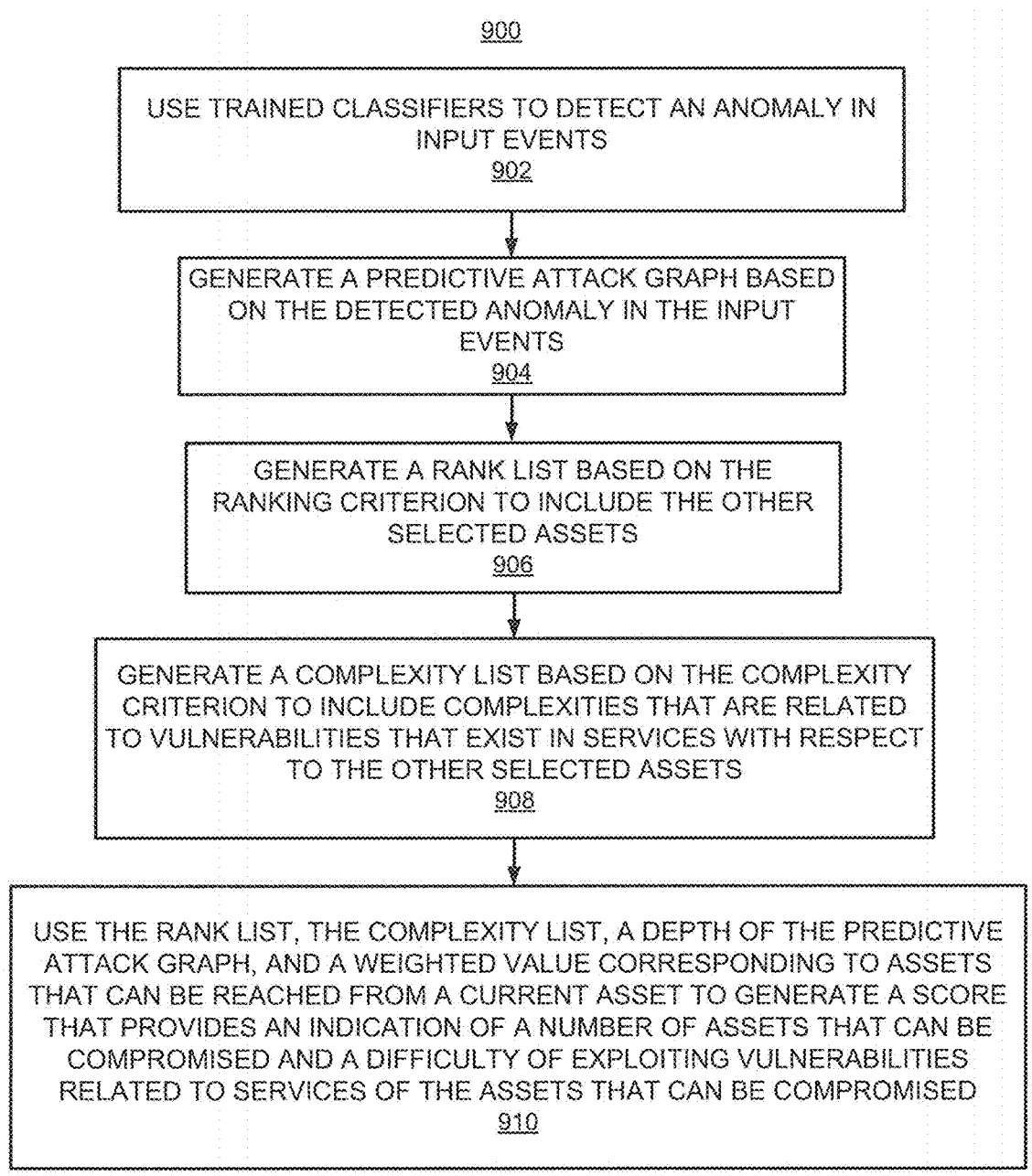
FIG. 9 illustrates a method for pre-cognitive SIEM, according to an example of the present disclosure.
Figure 10:
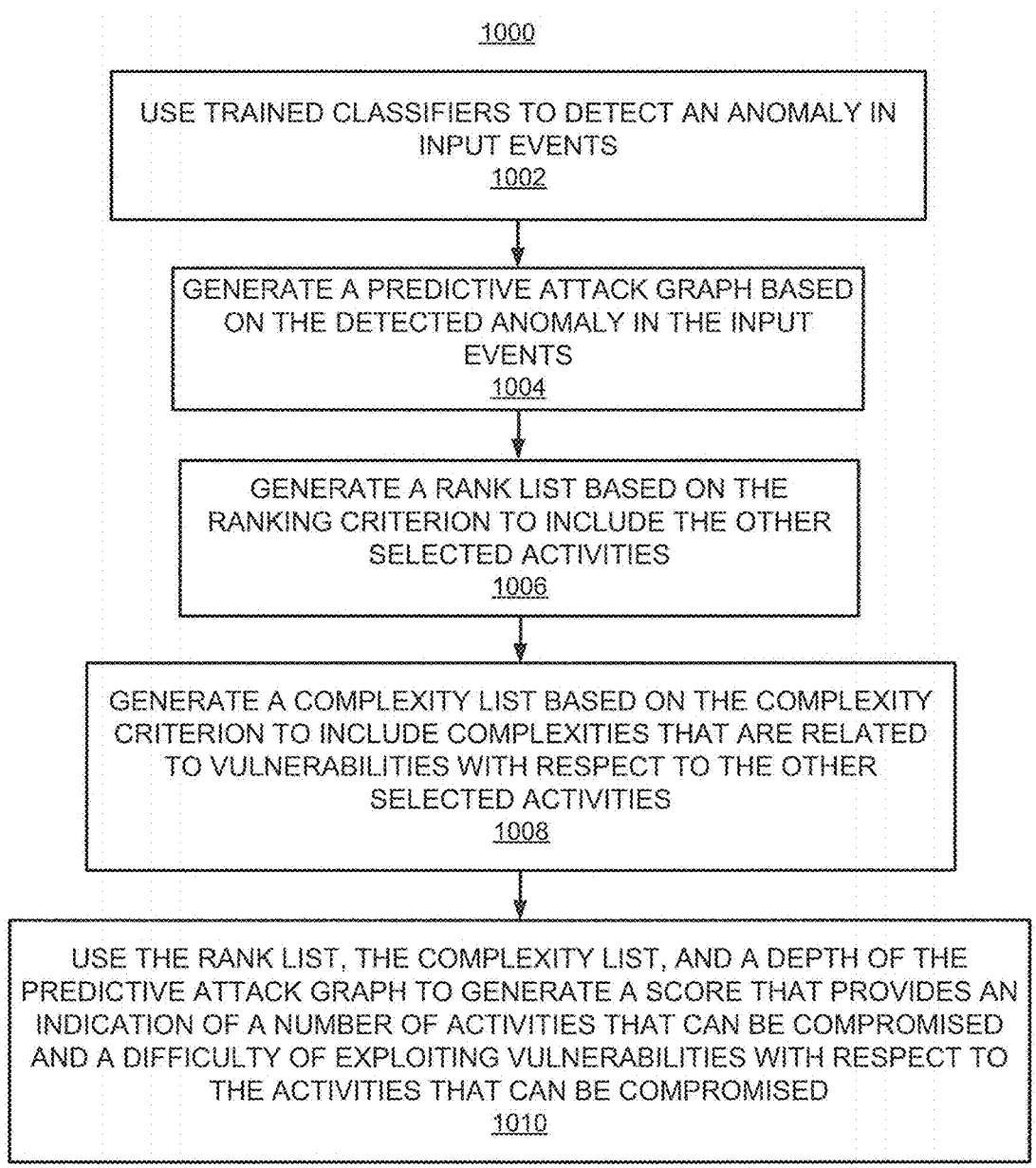
FIG. 10 illustrates further details of the method for pre-cognitive SIEM, according to an example of the present disclosure.

FIGS. 9 and 10 respectively illustrate flowcharts of methods 900 and 1000 for pre-cognitive SIEM, corresponding to the example of the pre-cognitive SIEM apparatus 100 whose construction is described in detail above. The methods 900 and 1000 may be implemented on the pre-cognitive SIEM apparatus 100 with reference to FIGS. 1-8 by way of example and not limitation. The methods 900 and 1000 may be practiced in other apparatus.

Referring to FIG. 9, for the method 900, at block 902, the method may include using trained classifiers to detect an anomaly in input events. The classifiers may be trained to learn patterns of clusters based on training events. For example, referring to FIG. 1, the anomaly detection module 112 may use trained classifiers to detect an anomaly in the input events 106.

At block 904, the method may include generating a predictive attack graph based on the detected anomaly in the input events. For example, referring to FIG. 1, the predictive attack graph generation module 114 may generate a predictive attack graph based on the detected anomaly in the input events 106. The predictive attack graph may provide an indication of different paths that can be taken from an asset that is related to the detected anomaly to compromise other selected assets in a network of the asset. The other selected assets may be selected based on a ranking criterion and a complexity criterion.

At block 906, the method may include generating a rank list based on the ranking criterion to include the other selected assets. For example, referring to FIGS. 1 and 3, the predictive attack graph generation module 114 may generate a rank list based on the ranking criterion (e.g., the pseudo-code at 314) to include the other selected assets.

At block 908, the method may include generating a complexity list based on the complexity criterion to include complexities that are related to vulnerabilities that exist in services with respect to the other selected assets. For example, referring to FIGS. 1 and 3, the predictive attack graph generation module 114 may generate complexity list based on the complexity criterion (e.g., the pseudo-code at 320) to include complexities that are related to vulnerabilities that exist in services with respect to the other selected assets.

At block 910, the method may include using the rank list, the complexity list, a depth of the predictive attack graph, and a weighted value corresponding to assets that can be reached from a current asset to generate a score that provides an indication of a number of assets that can be compromised and a difficulty of exploiting vulnerabilities related to services of the assets that can be compromised. For example, referring to FIG. 1, the predictive attack graph generation module 114 may use the rank list, the complexity list, a depth of the predictive attack graph, and a weighted value corresponding to assets that can be reached from a current asset to generate a score (i.e., the β-value) that provides an indication of a number of assets that can be compromised and a difficulty of exploiting vulnerabilities related to services of the assets that can be compromised. The weighted value may include a complexity level as well as relevance of the asset corresponding to all the assets that can be reached from a current asset.

According to an example, referring to FIG. 3 and the pseudo-code at 314 and 316, generating a predictive attack graph based on the detected anomaly in the input events may further include determining a rank of one of the other assets in the network of the asset, and in response to a determination that the rank of the other asset is greater than or equal to a rank threshold, selecting a path associated with the other asset to be added to the predictive attack graph.

According to an example, referring to FIG. 3 and the pseudo-code at 314 and 318, generating a rank list based on the ranking criterion to include the other selected assets may further include determining a rank of one of the other assets in the network of the asset, and in response to a determination that the rank of the other asset is greater than or equal to a rank threshold, adding the other asset to the rank list.

According to an example, referring to FIG. 3 and the pseudo-code at 310, 314, and 318, generating a rank list based on the ranking criterion to include the other selected assets may further include determining a rank of one of the other assets in the network of the asset, determining whether a privilege associated with a user for the other asset has been previously traversed, and in response to a determination that the privilege associated with the user for the other asset has been previously traversed, and the rank of the other asset is greater than or equal to a rank threshold, adding the other asset to the rank list.

According to an example, referring to FIG. 3 and the pseudo-code at 320 and 322, generating a complexity list based on the complexity criterion to include complexities that are related to vulnerabilities that exist in services with respect to the other selected assets may further include determining a complexity related to a vulnerability that exists in a service of one of the other assets in the network of the asset, and in response to a determination that the complexity related to the vulnerability that exists in the service of the other asset is less than a complexity threshold, adding the complexity to the complexity list.

According to an example, referring to FIG. 3 and the pseudo-code at 320 and 322, the network of the asset may include other assets, and generating a complexity list based on the complexity criterion to include complexities that are related to vulnerabilities that exist in services with respect to the other selected assets may further include determining a pre-condition associated with a service of one of the other assets in the network of the asset, determining a post-condition associated with a service of the asset, determining a complexity related to a vulnerability that exists in the service of the other asset in the network of the asset, and in response to a determination that the complexity related to the vulnerability that exists in the service of the other asset is less than a complexity threshold, and the pre-condition associated with the service of the other asset matches the post-condition associated with the service of the asset, adding the complexity to the complexity list.

According to an example, the method 900 may further include determining a path in the predictive attack graph that can be taken to compromise one of the other selected assets, determining an occurrence of an attack associated with the path, and creating an ephemeral rule to prevent the compromise of the other selected assets based on the occurrence of the attack. For example, referring to FIG. 1, the rule generation module 116 may determine a path in the predictive attack graph that can be taken to compromise one of the other selected assets, determine an occurrence of an attack associated with the path, and create an ephemeral rule to prevent the compromise of the other selected assets based on the occurrence of the attack.

According to an example, the method 900 may further include generating recommendations to overcome an attack related to the detected anomaly in the input events. The recommendations may include options related to minimizing a time associated with a loss of service, minimizing damage to physical assets, and/or minimizing a cost associated with the loss of service. For example, referring to FIG. 1, the attack response module 118 may generate recommendations to overcome an attack related to the detected anomaly in the input events.

According to an example, using the rank list, the complexity list, and a depth of the predictive attack graph to generate a score that provides an indication of a number of assets that can be compromised and a difficulty of exploiting vulnerabilities related to services of the assets that can be compromised may further include determining a real-time connectivity model of the network of the asset, and using the real-time connectivity model to update the generation of the score. For example, referring to FIG. 1, the predictive attack graph generation module 114 may determine a real-time connectivity model of the network of the asset, and use the real-time connectivity model to update the generation of the score.

Referring to FIG. 10, for the method 1000, at block 1002, the method may include using trained classifiers to detect an anomaly in input events. The classifiers may be trained to learn patterns of clusters based on training events.

At block 1004, the method may include generating a predictive attack graph based on the detected anomaly in the input events. The predictive attack graph may provide an indication of different paths that can be taken from an activity that is related to the detected anomaly to compromise other selected activities related to the activity, and the other selected activities may be selected based on a ranking criterion and a complexity criterion.

At block 1006, the method may include generating a rank list based on the ranking criterion to include the other selected activities.

At block 1008, the method may include generating a complexity list based on the complexity criterion to include complexities that are related to vulnerabilities with respect to the other selected activities.

At block 1010, the method may include using the rank list, the complexity list, and a depth of the predictive attack graph to generate a score that provides an indication of a number of activities that can be compromised and a difficulty of exploiting vulnerabilities with respect to the activities that can be compromised.

For the method 1000, the method may be similarly applicable to states instead of activities. For example, the states may represent vulnerabilities in an application and the paths that may be taken from one state (vulnerability) to reach another state (vulnerability).

According to an example, the activity may be related to other activities, and generating a predictive attack graph based on the detected anomaly in the input events may further include determining a rank of one of the other activities related to the activity, and in response to a determination that the rank of the other activity is greater than or equal to a rank threshold, selecting a path associated with the other activity to be added to the predictive attack graph.

According to an example, the activity may be related to other activities, and generating a complexity list based on the complexity criterion to include complexities that are related to vulnerabilities with respect to the other selected activities may further include determining a complexity related to a vulnerability that exists in one of the other activities related to the activity, and in response to a determination that the complexity related to the vulnerability that exists in the other activity is less than a complexity threshold, adding the complexity to the complexity list.

Figure 11:
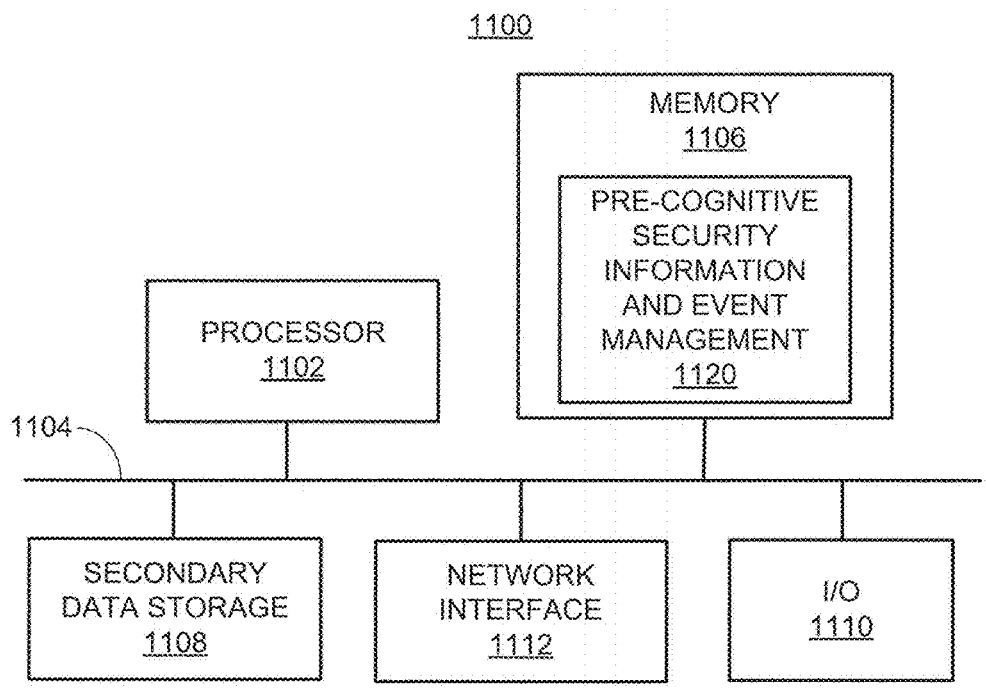
FIG. 11 illustrates a computer system, according to an example of the present disclosure.

FIG. 11 shows a computer system 1100 that may be used with the examples described herein. The computer system 1100 may represent a generic platform that includes components that may be in a server or another computer system. The computer system 1100 may be used as a platform for the apparatus 100. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The memory 1106 may include a pre-cognitive SIEM module 1120 including machine readable instructions residing in the memory 1106 during runtime and executed by the processor 1102. The pre-cognitive SIEM module 1120 may include the modules of the apparatus 100 shown in FIG. 1.

The computer system 1100 may include an I/O device 1110, such as a keyboard, a mouse, a display, etc. The computer system may include a network interface 1112 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide pre-cognitive security information and event management (SIEM), the machine readable instructions, when executed, cause at least one processor to:
  use trained classifiers to detect an anomaly in input events, wherein the trained classifiers are trained to learn patterns of clusters based on training events, and the trained classifiers comprise machine learning-based classifiers;
  generate a predictive attack graph based on the anomaly, wherein the predictive attack graph is to provide an indication of different paths that can be taken from an asset that is related to the anomaly to compromise other selected assets in a network of the asset, and wherein the other selected assets are selected based on a ranking criterion and a complexity criterion;
  generate a rank list based on the ranking criterion to include the other selected assets;
  generate a complexity list based on the complexity criterion to include complexities that are related to vulnerabilities that exist in services with respect to the other selected assets; and
  use the rank list, the complexity list, a depth of the predictive attack graph, and a weighted value corresponding to assets that can be reached from a current asset to generate a score that provides an indication of a number of assets that can be compromised and a difficulty of exploiting vulnerabilities related to services of the assets that can be compromised.

2. The non-transitory computer readable medium of claim 1, wherein to generate the predictive attack graph, the machine readable instructions, when executed, further cause the at least one processor to:
  determine a rank of one asset of the other selected assets; and
  in response to a determination that the rank is greater than or equal to a rank threshold, select a path associated with the one asset to be added to the predictive attack graph.

3. The non-transitory computer readable medium of claim 1, wherein to generate the rank list, the machine readable instructions, when executed, further cause the at least one processor to:
  determine a rank of one asset of the other selected assets; and
  in response to a determination that the rank is greater than or equal to a rank threshold, add the one asset to the rank list.

4. The non-transitory computer readable medium of claim 1, wherein to generate the rank list, the machine readable instructions, when executed, further cause the at least one processor to:
  determine a rank of one asset of the other selected assets;
  determine whether a privilege associated with a user for the one asset has been previously traversed; and
  in response to a determination that the privilege has been previously traversed, and the rank of the one asset is greater than or equal to a rank threshold, add the one asset to the rank list.

5. The non-transitory computer readable medium of claim 1, wherein to generate the complexity list, the machine readable instructions, when executed, further cause the at least one processor to:
  determine a complexity related to a vulnerability that exists in a service of one asset of the other selected assets; and
  in response to a determination that the complexity related to the vulnerability that exists in a service of the one asset is less than a complexity threshold, add the complexity to the complexity list.

6. The non-transitory computer readable medium of claim 1, wherein to generate the complexity list, the machine readable instructions, when executed, further cause the at least one processor to:
  determine a pre-condition associated with a service of one asset of the other selected assets;
  determine a post-condition associated with a service of the one asset;
  determine a complexity related to a vulnerability that exists in the service of the one asset; and
  in response to a determination that the complexity is less than a complexity threshold, and the pre-condition matches the post-condition, add the complexity to the complexity list.

7. The non-transitory computer readable medium of claim 1, wherein the machine readable instructions, when executed, further cause the at least one processor to:
  determine a path in the predictive attack graph that can be taken to compromise one asset of the other selected assets;
  determine an occurrence of an attack associated with the path; and
  create an ephemeral rule to prevent compromises of the other selected assets based on the occurrence.

8. The non-transitory computer readable medium of claim 1, wherein the machine readable instructions, when executed, further cause the at least one processor to:
  generate recommendations to overcome an attack related to the anomaly in the input events, wherein the recommendations include options related to at least one of minimizing a time associated with a loss of service, minimizing damage to physical assets, and minimizing a cost associated with the loss of service.

9. The non-transitory computer readable medium of claim 1, wherein to generate the score, the machine readable instructions, when executed, further cause the at least one processor to:
  determine a real-time connectivity model of the network; and
  use the real-time connectivity model to update the generation of the score.

10. A pre-cognitive security information and event management (SIEM) apparatus comprising:
  at least one processor;
  an anomaly detection module, executed by the at least one processor, to use trained classifiers to detect an anomaly in input events, wherein the trained classifiers are trained to learn patterns of clusters based on training events, and the trained classifiers comprise machine learning-based classifiers; and
  a predictive attack graph generation module, executed by the at least one processor, to generate a predictive attack graph based on the anomaly in the input events, wherein the predictive attack graph is to provide an indication of different paths that can be taken from a state that is related to the anomaly to compromise other selected states related to the state, wherein the other selected states are selected based on a ranking criterion and a complexity criterion, and wherein the predictive attack graph generation module is to generate a rank list based on the ranking criterion to include the other selected states, generate a complexity list based on the complexity criterion to include complexities that are related to vulnerabilities with respect to the other selected states, and use the rank list, the complexity list, and a depth of the predictive attack graph to generate a score that provides an indication of a number of states that can be compromised and a difficulty of exploiting vulnerabilities with respect to the states that can be compromised.

11. The pre-cognitive STEM apparatus according to claim 10, wherein the state is related to other states, and wherein to generate the predictive attack graph, the predictive attack graph generation module is further executed by the at least one processor to:
determine a rank of one state of the other states; and
in response to a determination that the rank is greater than or equal to a rank threshold, select a path associated with the one state to be added to the predictive attack graph.

12. The pre-cognitive SIEM apparatus according to claim 10, wherein the state is related to other states, and wherein to generate the complexity list, the predictive attack graph generation module is further executed by the at least one processor to:
determine a complexity related to a vulnerability that exists in one state of the other states; and
in response to a determination that the complexity is less than a complexity threshold, add the complexity to the complexity list.

13. A method for pre-cognitive security information and event management (SIEM), the method comprising:
using trained classifiers to detect an anomaly in input events, wherein the trained classifiers are trained to learn patterns of clusters based on training events, and the trained classifiers comprise machine learning-based classifiers;
generating, by at least one processor, a predictive attack graph based on the anomaly in the input events, wherein the predictive attack graph is to provide an indication of different paths that can be taken from an activity that is related to the anomaly to compromise other selected activities related to the activity, and wherein the other selected activities are selected based on a ranking criterion and a complexity criterion;
generating a rank list based on the ranking criterion to include the other selected activities;
generating a complexity list based on the complexity criterion to include complexities that are related to vulnerabilities with respect to the other selected activities; and
using the rank list, the complexity list, and a depth of the predictive attack graph to generate a score that provides an indication of a number of activities that can be compromised and a difficulty of exploiting vulnerabilities with respect to the activities that can be compromised.

14. The method according to claim 13, wherein the activity is related to other activities, and wherein generating the predictive attack graph further comprises:
determining a rank of one activity of the other activities; and
in response to a determination that the rank of the one activity is greater than or equal to a rank threshold, selecting a path associated with the one activity to be added to the predictive attack graph.

15. The method according to claim 13, wherein the activity is related to other activities, and wherein generating the complexity list further comprises:
determining a complexity related to a vulnerability that exists in one activity of the other activities; and
in response to a determination that the complexity is less than a complexity threshold, adding the complexity to the complexity list.

* * * * *